US00H002293H

(19) United States
(12) Statutory Invention Registration
Byrd

(10) Reg. No.: US H2293 H
(43) Published: Sep. 2, 2014

(54) PIVOT SHAFT SEAL

(75) Inventor: James Byrd, Etowah, NC (US)

(73) Assignee: BorgWarner Inc., Auburn Hills, MI (US)

(21) Appl. No.: 13/567,573

(22) Filed: Aug. 6, 2012

(65) Prior Publication Data

US 2014/0035239 A1 Feb. 6, 2014

(51) Int. Cl.
*F16J 15/34* (2006.01)

(52) U.S. Cl.
CPC ..... *F16J 15/3464* (2013.01)
USPC ..... 277/576

(58) Field of Classification Search
CPC ..... F16J 15/3464
USPC ..... 277/576
See application file for complete search history.

(56) References Cited

U.S. PATENT DOCUMENTS

2013/0089411 A1* 4/2013 Ward ..... 277/500
2013/0287552 A1* 10/2013 House et al. ..... 415/170.1
2014/0035239 A1* 2/2014 Byrd ..... 277/576

* cited by examiner

*Primary Examiner* — Daniel Pihulic
(74) *Attorney, Agent, or Firm* — Holland & Hart LLP

(57) ABSTRACT

A pivot shaft seal for sealing between a turbocharger housing and a pivot shaft. The seal includes a metal seal ring including a mounting flange and a resilient sealing flange extending radially inward from the mounting flange. The sealing flange is sized to snugly fit about the pivot shaft. The seal includes a clamping bushing operative to clamp the mounting flange against the turbocharger housing.

1 Claim, 1 Drawing Sheet

Figure 1:
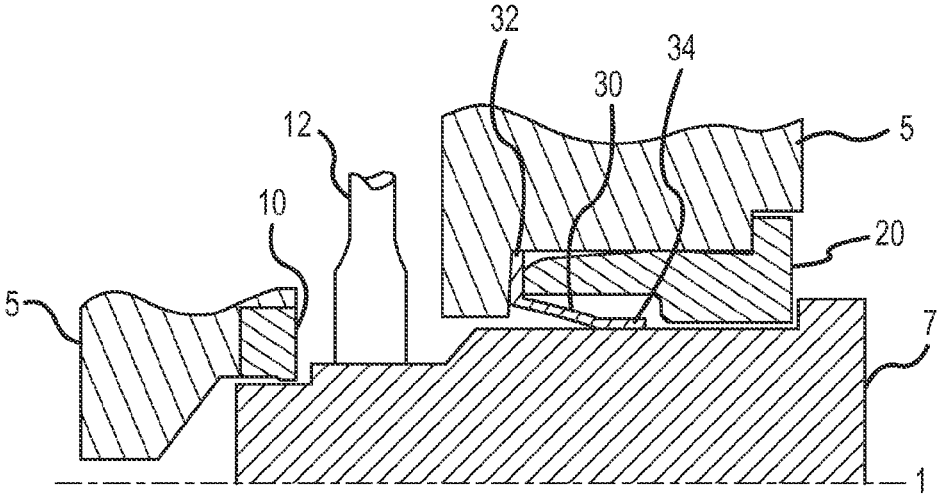

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PIVOT SHAFT SEAL

BACKGROUND

Today's internal combustion engines must meet ever-stricter emissions and efficiency standards demanded by consumers and government regulatory agencies. Accordingly, automotive manufacturers and suppliers expend great effort and capital in researching and developing technology to improve the operation of the internal combustion engine. Turbochargers are one area of engine development that is of particular interest.

A turbocharger uses exhaust gas energy, which would normally be wasted, to drive a turbine. The turbine is mounted to a shaft that in turn drives a compressor. The turbine converts the heat and kinetic energy of the exhaust into rotational power that drives the compressor. The objective of a turbocharger is to improve the engine's volumetric efficiency by increasing the density of the air entering the engine. The compressor draws in ambient air and compresses it into the intake manifold and ultimately the cylinders. Thus, a greater mass of air enters the cylinders on each intake stroke.

Given that a turbocharger must handle exhaust straight from the engine, it can be appreciated that the components of a turbocharger are subjected to extreme temperatures. Many turbocharger components have been designed to handle extreme heat, particularly on the turbine side of the turbocharger. However, some components are difficult to make temperature resistant while maintaining functionality, such as the moving joints, actuators, and seals associated with variable turbine geometry (VTG) mechanisms and waste gate control mechanisms.

For example, traditional VTG assemblies include an actuator pivot shaft that extends through an actuator flange bushing to connect the actuator to the vane pack and adjustment ring assembly. This traditional design uses piston rings on the pivot shaft as a seal mechanism in order to contain hot, pressurized exhaust gases from leaking to atmosphere. However, the standard piston ring design allows some leakage of exhaust gas to the outside of the turbo assembly. Accordingly, there is a need for a pivot shaft seal that can prevent hot, pressurized exhaust gases from leaking under high heat conditions while still allowing the pivot shaft to rotate.

SUMMARY

Provided herein is a pivot shaft seal for sealing between a turbocharger housing and a VTG pivot shaft or waste gate valve and arm assembly. The seal includes a metal seal ring including a mounting flange and a resilient sealing flange extending radially inward from the mounting flange. The sealing flange is sized to snugly fit about the pivot shaft. The seal includes a clamping bushing operative to clamp the mounting flange against the turbocharger housing.

These and other aspects of the disclosed technology will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

DRAWINGS

Non-limiting and non-exhaustive embodiments of the pivot shaft seal, including the preferred embodiment, are described with reference to the following figures, wherein like reference numerals refer to like parts throughout the various views unless otherwise specified.

Figure 2:
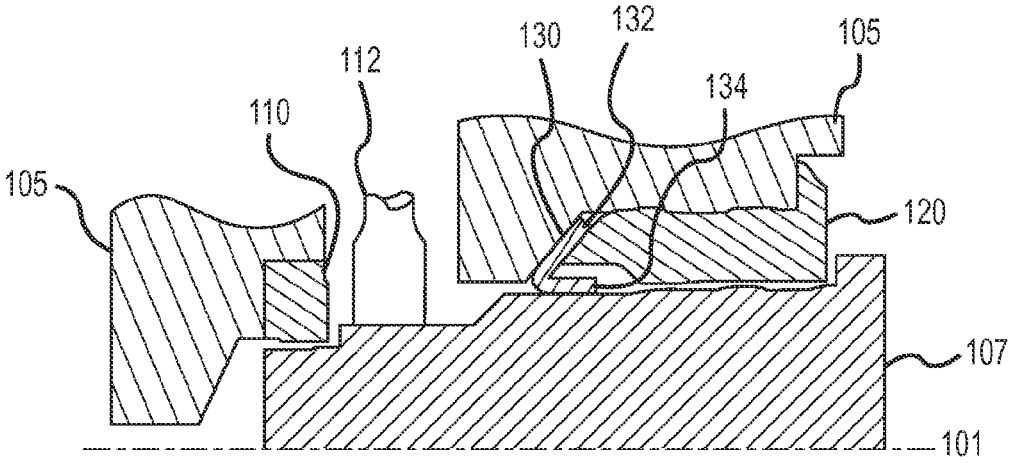

FIG. 1 is a partial cross-section illustrating a VTG pivot shaft seal according to a first exemplary embodiment; and FIG. 2 is a partial cross-section illustrating a VTG pivot shaft seal according to a second exemplary embodiment.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Provided herein is a pivot shaft seal for sealing between a turbocharger housing and a VTG pivot shaft. FIG. 1 illustrates a pivot shaft seal according to a first exemplary embodiment. The VTG assembly includes a pivot shaft 7 which connects to the variable turbine geometry vanes (not shown). Pivot shaft 7 is connected to a pivot arm 12. Shaft 7 rides in a first bushing 10 and a second bushing 20. In this embodiment, the seal 30 includes a metal seal ring including a mounting flange 32 and a resilient sealing flange 34. Sealing flange 34 extends radially inward from mounting flange 32. It can be appreciated from the figure that mounting flange 32 extends orthogonally with respect to the centerline 1 of shaft 7. The sealing flange 34 is sized to snugly fit about the pivot shaft 7. The seal includes clamping bushing 20 that is operative to clamp the mounting flange 32 against the turbocharger housing 5, as well as support the shaft 7.

When bushing 20 is installed into turbo housing 5, it clamps the seal flange 32 between the bushing 20 and housing 5, thereby eliminating the potential of air leaks between the housing and bushing. When the actuator pivot shaft 7 is installed, the ramp on the shaft allows the resilient sealing flange 34 to ride against the shaft. In addition to the spring-load force against the shaft, the exhaust air pressure helps to activate the seal and keep it in contact with the shaft. The area of the seal that is clamped between the bushing and housing may be thicker than the end that seals against the pivot shaft for added strength. The seal itself can be a thin, high-temperature-resistant steel alloy such as Inconel (high-nickel alloy). The seal flange 34 in this case has a thickness of between 0.010-0.040 inch, but it is not limited to this range. The internal diameter of the seal may be slightly smaller than the pivot shaft outside diameter so that a snug, air-tight fit is achieved.

FIG. 2 illustrates a pivot shaft seal according to a second exemplary embodiment. In this case, the seal is again for use between a turbocharger housing 105 and a pivot shaft 107. In this case, the variable turbine geometry assembly includes shaft 107 which is connected to pivot arm 112. The pivot shaft 107 rotates in bushings 110 and 120. It should be appreciated that bushing 120 comprises part of the seal. The pivot shaft seal 130 includes a mounting flange 132 with a sealing flange 134. The pivot shaft seal in this case is similar to that described above with respect to FIG. 1; however, in this case, it can be appreciated that mounting flange 132 extends at an angle with respect to centerline 101 of shaft 107. Accordingly, the mounting flange 132 and sealing flange 134 form a V-shaped configuration. While the exemplary embodiments have been explained with respect to a VTG pivot shaft, the disclosed technology may be used on other pivoting or rotating shafts, such as for example waste gate waste gate valve and arm assemblies.

Accordingly, the pivot shaft seal has been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A pivot shaft seal for sealing between a turbocharger housing and a pivot shaft, the seal comprising:

a metal seal ring including a mounting flange and a resilient sealing flange extending radially inward from the mounting flange, wherein the sealing flange is sized to snugly fit about a pivot shaft; and a clamping bushing operative to clamp the mounting flange against a turbocharger housing.

* * * * *